US008140614B2

(12) United States Patent
Bower, III et al.

(10) Patent No.: US 8,140,614 B2
(45) Date of Patent: Mar. 20, 2012

(54) DISTRIBUTED COMPUTING ENVIRONMENT WITH REMOTE DATA COLLECTION MANAGEMENT

(75) Inventors: Fred A. Bower, III, Durham, NC (US);
Rodney H. Brown, Orlando, FL (US);
Tushar D. Fadale, Raleigh, NC (US);
Thomas J. Fox, Apex, NC (US);
Richard E. Harper, Chapel Hill, NC (US); David B. Roberts, Cary, NC (US);
Ketan K. Shah, Cary, NC (US); Celia A. Schreiber, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 11/144,246

(22) Filed: Jun. 2, 2005

(65) Prior Publication Data

US 2006/0277283 A1    Dec. 7, 2006

(51) Int. Cl.
*G06F 15/16* (2006.01)
*G06F 15/173* (2006.01)
*G06F 9/44* (2006.01)
(52) U.S. Cl. .................. 709/202; 709/223; 719/317
(58) Field of Classification Search .................. 719/310, 719/317, 318, 316; 709/201–203, 223, 224; 717/174, 176
See application file for complete search history.

(56) References Cited

U.S. PATENT DOCUMENTS

| | | | |
|---|---|---|---|
| 4,665,520 A | 5/1987 | Strom et al. | |
| 5,619,644 A | 4/1997 | Crockett et al. | |
| 5,664,093 A | 9/1997 | Barnett et al. | |
| 5,781,703 A * | 7/1998 | Desai et al. | 706/50 |
| 6,014,612 A | 1/2000 | Larson et al. | |
| 6,023,507 A | 2/2000 | Wookey | |
| 6,085,243 A * | 7/2000 | Fletcher et al. | 709/224 |
| 6,192,034 B1 * | 2/2001 | Hsieh et al. | 370/241 |
| 6,236,983 B1 * | 5/2001 | Hofmann et al. | 706/47 |
| 6,470,388 B1 | 10/2002 | Niemi et al. | |
| 6,553,403 B1 | 4/2003 | Jarriel et al. | |
| 6,823,382 B2 * | 11/2004 | Stone | 709/224 |
| 6,978,422 B1 * | 12/2005 | Bushe et al. | 715/734 |
| 7,020,697 B1 * | 3/2006 | Goodman et al. | 709/223 |
| 7,165,087 B1 * | 1/2007 | Graupner et al. | 709/202 |
| 7,409,676 B2 * | 8/2008 | Agarwal et al. | 717/120 |
| 7,467,198 B2 * | 12/2008 | Goodman et al. | 709/223 |
| 7,539,706 B1 * | 5/2009 | Campbell | 707/204 |
| 7,552,138 B2 * | 6/2009 | Nemoto et al. | 707/102 |

(Continued)

OTHER PUBLICATIONS

Kennedy et al. "Monitoring of Distributed Processes With Mobile Agents", 2000 IEEE, 6 pages.*

(Continued)

*Primary Examiner* — Van Nguyen
(74) *Attorney, Agent, or Firm* — Brandon C. Kennedy; Cynthia G. Seal; Biggers & Ohanian, LLP

(57) ABSTRACT

Aspects of a distributed computing environment with remote data collection management include a management server, and a plurality of computer systems networked to and managed by the management server. Each of the plurality of computer systems includes a listening agent to receive process code from a management server and to control the periodic execution of the process code to collect data from the plurality of computer systems. The periodic execution occurs without requiring a connection to be maintained between the plurality of computer systems and the management server. Further, the data collected includes data collected from problem determination activities.

15 Claims, 3 Drawing Sheets

U.S. PATENT DOCUMENTS

| | | | |
|---|---|---|---|
| 7,580,996 B1* | 8/2009 | Allan et al. | 709/224 |
| 7,600,229 B1* | 10/2009 | Shmuylovich et al. | 718/105 |
| 2001/0034711 A1* | 10/2001 | Tashenberg | 705/52 |
| 2002/0010803 A1 | 1/2002 | Oberstein et al. | |
| 2003/0135439 A1* | 7/2003 | Yagishita | 705/36 |
| 2003/0158937 A1 | 8/2003 | Johal et al. | |
| 2004/0158626 A1* | 8/2004 | Douglas | 709/224 |
| 2005/0015624 A1* | 1/2005 | Ginter et al. | 713/201 |
| 2006/0080656 A1* | 4/2006 | Cain et al. | 717/174 |
| 2006/0195561 A1* | 8/2006 | Keane et al. | 709/223 |

OTHER PUBLICATIONS

Buchanan et al. "Enhancing Network Management Using Mobile Agents", 2000 IEEE, 9 pages.*

IBM Technical Disclosure Bulletin, *Knowledge Base Structure for Fault Management*, vol. 37, No. 07, Jul. 1994, pp. 521-525.

* cited by examiner

DISTRIBUTED COMPUTING ENVIRONMENT WITH REMOTE DATA COLLECTION MANAGEMENT

FIELD OF THE INVENTION

The present invention relates to distributed computing environments, and more particularly to managing data collection remotely a distributed computing environment.

BACKGROUND OF THE INVENTION

Multiple distributed computing systems are commonly used in today's computing environment. FIG. 1 illustrates a block diagram of a typical distributed computing system where a management server 100, such as an IBM eServer Model x205, is networked via network 110 (such as a WAN, LAN, the Internet, etc.) to a plurality of managed computer systems 120, for example, IBM eServer xSeries and Blade-Center Servers. A challenge in these environments is to detect system failures, prevent system outages, and isolate failing components so that they can be updated or replaced. Attempts to address this problem have led to several problem determination tools that address specific classes of problems within a system. Each tool performs problem determination activities to address that specific niche for which it was developed. Thus, in order to diagnose the whole system, a multiplicity of these tools are required, since each tool provides vital pieces of information to the problem determination puzzle. When information from each tool has been gathered, the results must be correlated to fully scope and predict system failures.

In the present environment, a system administrator is responsible for selecting the appropriate tools to launch, installing the tools if necessary, correlating information from the tools, and analyzing the results to prevent or solve problems. Often, travel to the system site is required to perform these activities. Such reliance on a system administrator is time-consuming, as well as error prone due to variations in knowledge and experience with respect to the maintenance of awareness of the available tools and tool updates and the type and format of data returned by each tool.

With a need for discovering, installing, updating and launching problem determination tools on remotely located systems in a manner that allows for the capability to correlate and analyze the results of these tools in a central location to predict impending faults and generate solutions to existing faults, another challenge is faced. When periodic execution of a certain process or code block (e.g., tasks of task list 130) is required in a distributed system, such as problem determination code, it has been known to allow the management server 100 to keep track of time and allow a message to be sent to each of the distributed systems at regular intervals. However, as the number of managed systems 120 grows, this approach becomes limited due to the time it takes to notify each system of the particular execution and the need to have all systems connected to the management server 100 to receive the commands.

Accordingly, what is needed is a manner of managing data collection remotely a distributed computing environment, including providing for periodic execution and distributed problem determination for remote management of problem determination tools and data in distributed computing environments. The present invention addresses such a need.

BRIEF SUMMARY OF THE INVENTION

Aspects of a distributed computing environment with remote data collection management are described. The aspects include a management server, and a plurality of computer systems networked to and managed by the management server. Each of the plurality of computer systems includes a listening agent to receive process code from a management server and to control the periodic execution of the process code to collect data from the plurality of computer systems. The periodic execution occurs without requiring a connection to be maintained between the plurality of computer systems and the management server. Further, the data collected includes data collected from problem determination activities.

Through the present invention, the periodic execution of a certain process of block code in managed systems in a distributed computing environment is achieved with the utilization of a listening agent in the managed systems. The ability to perform the periodic execution supports a service method for distributed data collection and analysis to enhance problem determination activity in the distributed computing environment. This allows the problem determination tools available to the system to be utilized to the fullest extent in an efficient and common manner. These and other advantages of the aspects of the present invention will be more fully understood in conjunction with the following detailed description and accompanying drawings.

DETAILED DESCRIPTION OF THE INVENTION

The present invention relates to managing data collection remotely in a distributed computing environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
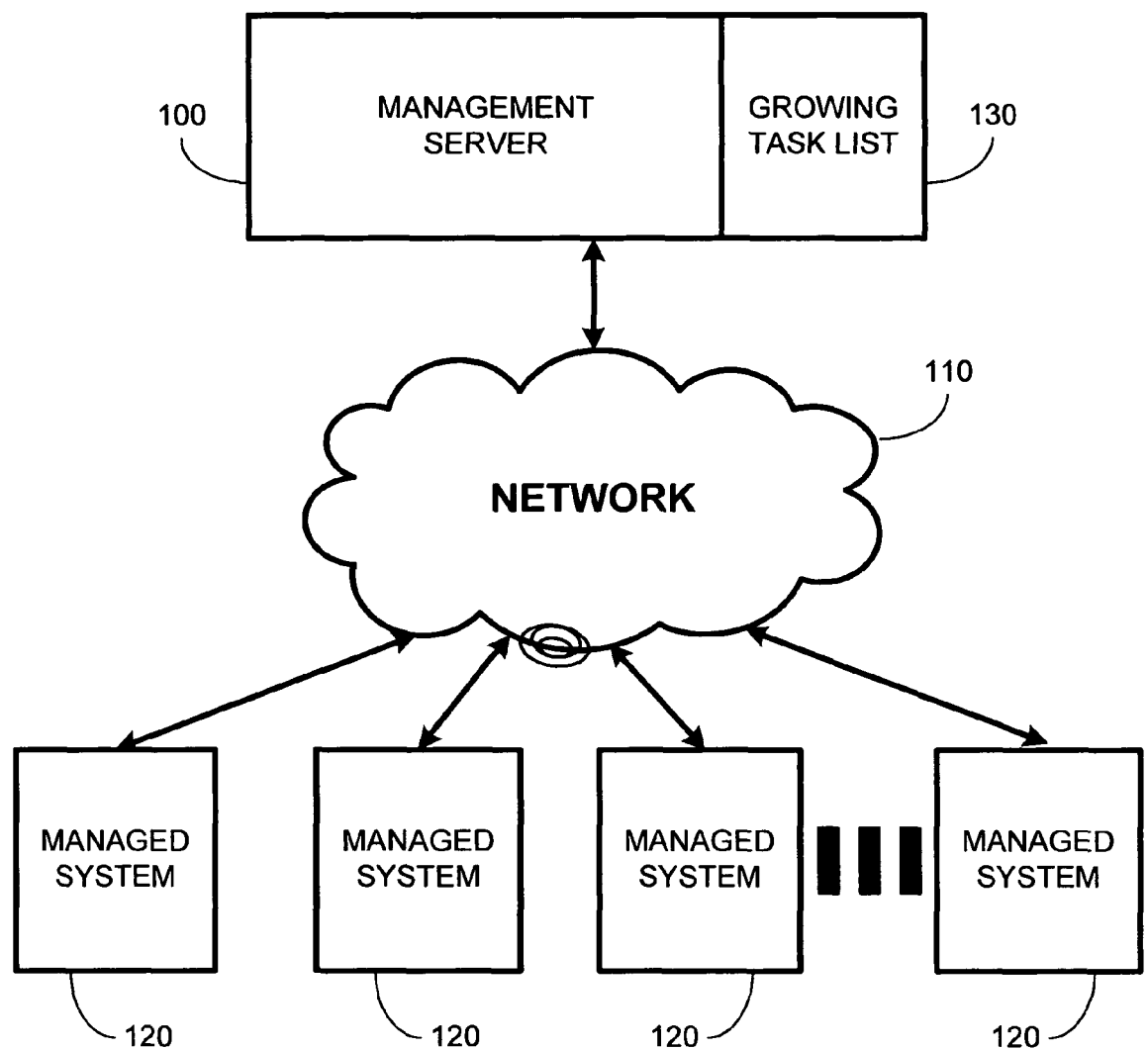
FIG. 1 illustrates a block diagram of a typical distributed computing environment.
Figure 2:
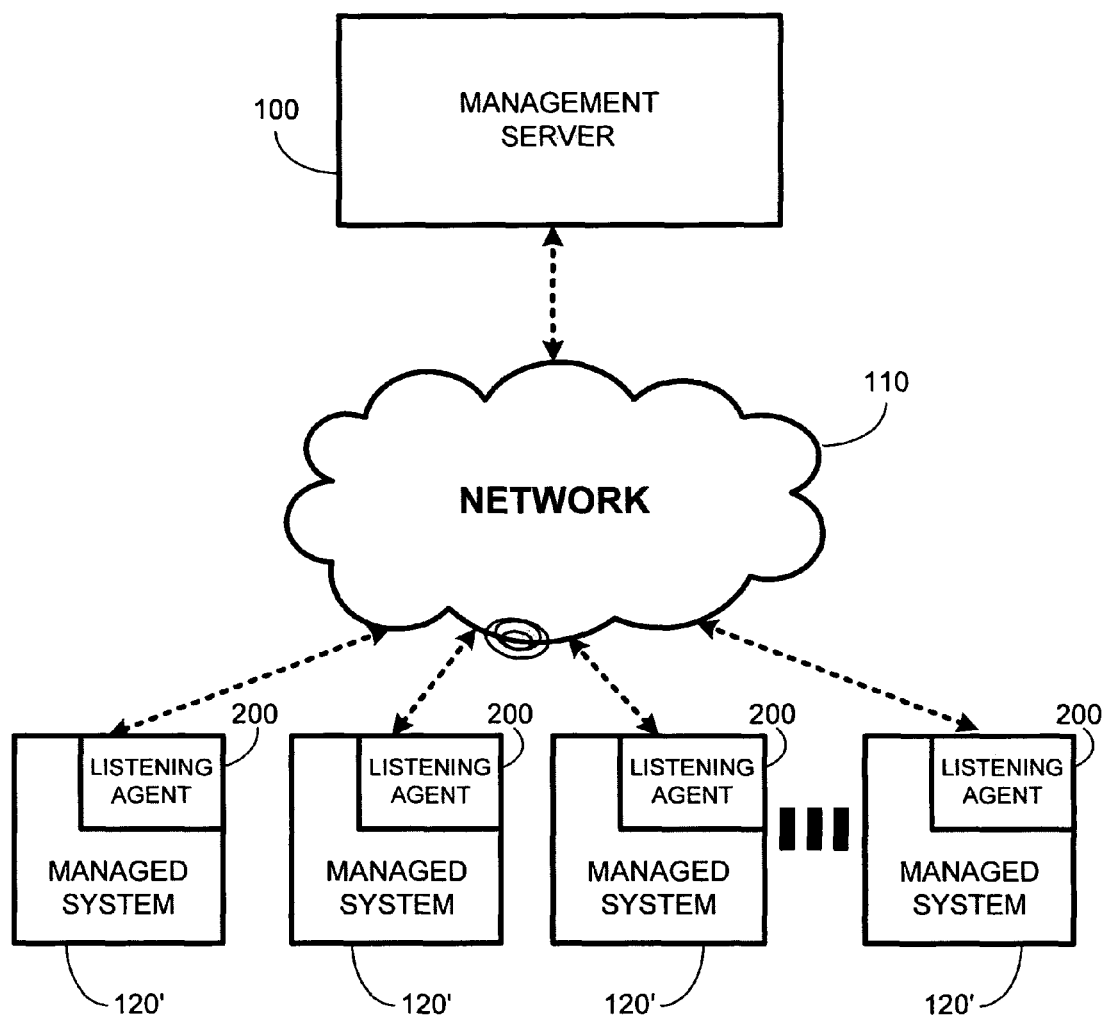
FIG. 2 illustrates a block diagram of a distributed computing environment in accordance with the present invention.

In accordance with the present invention, the distributed system of FIG. 1 is modified to include a resident listening agent 200 in the managed systems 120', as shown in FIG. 2. The resident listening agent 200 is provided, for example, as a software process written in an appropriate programming language and stored on a computer readable medium, and executes on each of the distributed systems by taking commands from the management server 100 to configure an appropriate periodic execution of a certain process or code block. The resident listening agent 200 then takes charge of the periodic execution of the process or code block. The listening agent 200 can then be disconnected from the management server 100 and still perform the periodic action necessary to collect data.

For example, the following is a description of a command set between the management server 100 and the listening agent 200 for use in achieving periodic execution in a remote system via the listening agent 200:

Connect <hostname or IP# (i.e., Internet Protocol Number)>: establish communication to the given host and set response address.

Disconnect: tear down socket-based communication with the connected management system.

Transport: notify managed system to send collected results.

SetPeriod <DATA_COLLECTION_CLASS> <TIMEBETWEENSAMPLESINSECONDS>: management server 100 instructs listening agent 200 to schedule components capable of collecting data defined by DATA_COLLECTION_CLASS every TIMEBETWEENSAMPLESINSECONDS. Listening agent 200 schedules execution using local time and can now be disconnected from the management server 100.

GetPeriod: gets the period set by SetPeriod.

Figure 3:
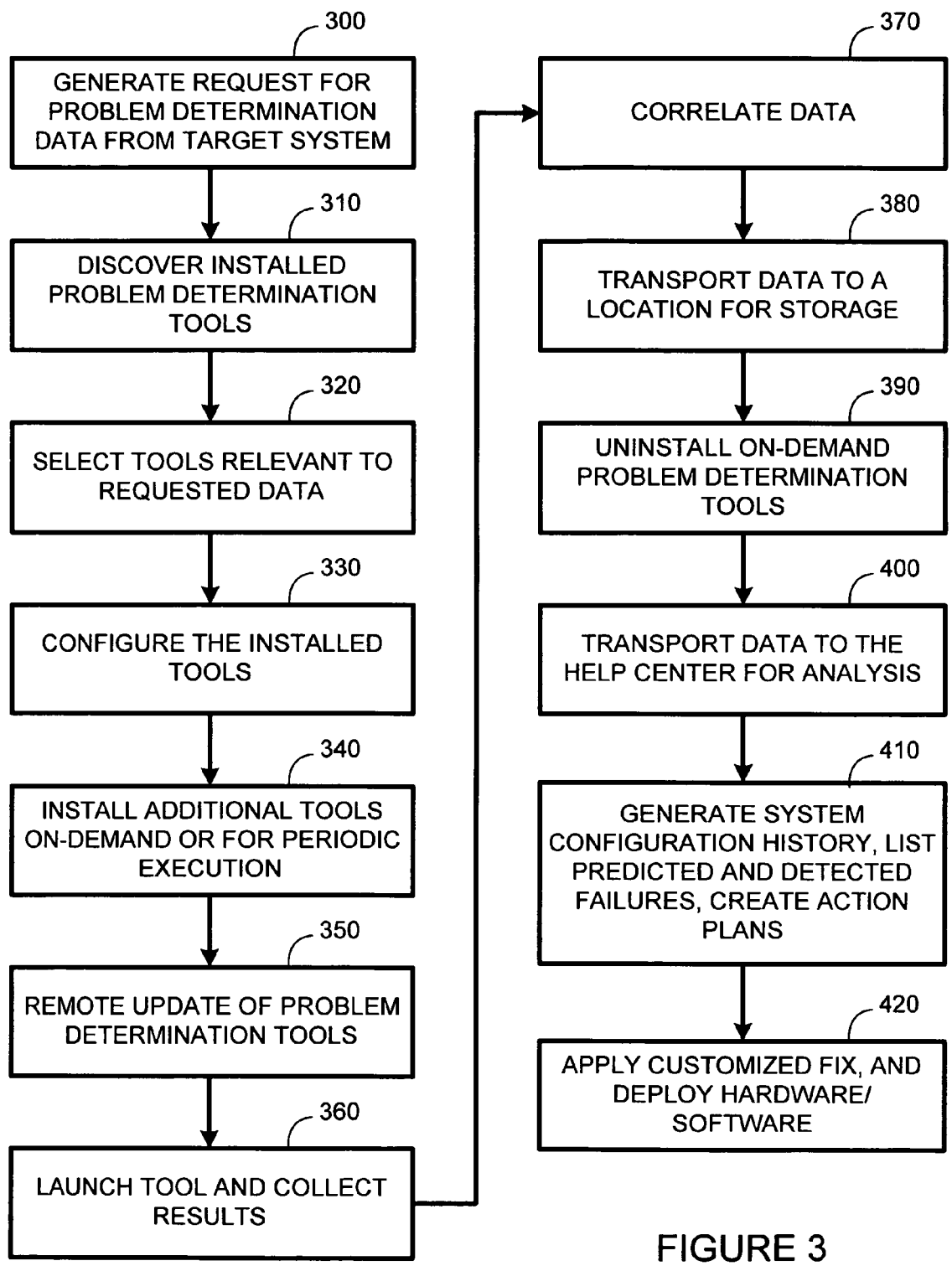
FIG. 3 illustrates a block flow diagram of distributed problem determination for remote management of problem determination tools and data in accordance with the present invention.

The ability to perform periodic execution in this manner provides support for a distributed problem determination system for remote management of problem determination tools and data in accordance with the present invention, as described with reference to the block flow diagram illustrated in FIG. 3. Referring to FIG. 3, the remote management begins when a request is generated for problem determination data, the request initiated by a customer or an external help center, as permitted, and received by a target system, such as via a listening agent, in the distributed computing environment (step 300). The installed problem determination tools on the target system are then discovered (step 310). The discovered tools that are relevant to the requested data are selected and configured (step 320). Additional tools are installed on-demand or for periodic execution in the target system (step 330), and any updating of the problem determination tools is done remotely by the management system (step 340).

With the problem determination tools selected and configured, the tools are launched and the problem determination results are collected within the target system (step 350). Correlation of all the data collected commences (step 360), and the correlated data is transported to a remote system for local storage of the results (step 370). Any of the problem determination tools installed on-demand are uninstalled (step 380). The stored results are transported, e.g., to the help center, for analysis (step 390). From the results, a system configuration history is generated, with detected and predicted failures listed, and actions plans created (step 400). Application of the solution occurs via hardware and software deployment or an on-site service call (step 410).

As an example of how the steps proceed in a distributed computing environment, an administrative system is enabled to request performance data from a target system. The target system accepts the request and proceeds to discover the installed applications that provide system performance information. The target system continues by configuring the installed tools based on a default or generated rule set. The data from each tool is correlated on the target system and then transported to a remote system for further analysis. If a performance problem is detected, the correlated data from the target system is transmitted to an external service entity to determine hardware and software configuration errors or generate action plans to solve the issue. The service organization may produce some of the problem determination tools that are used in the process and is able to determine the level of the tools on the remote system and deploy updates and additional tools on a periodic basis or on demand.

Through the present invention, the periodic execution of a certain process of block code in managed systems in a distributed computing environment is achieved with the utilization of a listening agent in the managed systems. The ability to perform the periodic execution supports a service method for distributed data collection and analysis to enhance problem determination activity in the distributed computing environment. This allows the problem determination tools available to the system to be utilized to the fullest extent in an efficient and common manner. The resultant system is capable of automatically determining which tools should be executed to aid determination of a particular problem and provides for deploying, updating, and uninstalling the problem determination tools within a network of system while categorizing data, commonly formatting data, and analyzing the collected data.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method for managing data collection remotely in a distributed computing environment, the distributed computing environment comprising a management server and a plurality of computer systems, each of the computer systems comprising a listening agent, the method comprising:

receiving, by each listening agent from the management server, data collection process code, the data collection process code comprising a module of computer program instructions that, when executed at the behest of the listening agent, collects data describing the computer system;

executing, periodically at the behest of each listening agent, the data collection process code, including:

discovering, by the listening agent, one or more problem determination tools installed within at least one computer system; selecting one or more of the installed problem determination tools relevant to a request for problem determination data, and retrieving, on-demand by the listening agent from the management server, one or more additional tools; and installing the one or more additional tools;

collecting, by the data collection process code, data describing the computer system, including executing the installed problem determination tools and the additional tools to collect problem determination data; and uninstalling the additional tools by the listening agent upon completion of execution of the additional tools.

2. The method of claim 1 further comprising configuring the selected problem determination tools based on a rule set and correlating data from the selected problem determination tools.

3. The method of claim 2 further comprising transporting the correlated data to a remote system.

4. The method of claim 3 further comprising utilizing the transported data for analysis and creation of action plans.

5. The method of claim 4 further comprising applying the action plans via hardware and software deployment.

6. A distributed computing environment with remote data collection management, the environment comprising:

a management server; and a plurality of computer systems coupled to the management server for data communications, each of the plurality of computer systems including a listening agent, each listening agent configured to carry out the steps of:

receiving, by each listening agent from the management server, data collection process code, the data collection process code comprising a module of computer program instructions that, when executed at the behest of the listening agent, collects data describing the computer system;

executing, periodically at the behest of each listening agent, the data collection process code, including:

discovering, by the listening agent, one or more problem determination tools installed within at least one computer system; selecting one or more of the installed problem determination tools relevant to a request for problem determination data, and retrieving, on-demand by the listening agent from the management server, one or more additional tools; and installing the one or more additional tools;

collecting, by the data collection process code, data describing the computer system, including executing the installed problem determination tools and the additional tools to collect problem determination data; and uninstalling the additional tools by the listening agent upon completion of execution of the additional tools.

7. The environment of claim 6 wherein the at least one computer system further configures the selected problem determination tools based on a rule set and correlates data from the selected problem determination tools.

8. The environment of claim 7 wherein the at least one computer system further transports the correlated data to a remote system.

9. The environment of claim 8 wherein the remote system further utilizes the transported data for analysis and creation of action plans.

10. The environment of claim 9 wherein the remote system applies the action plans via hardware and software deployment in the at least one computer system.

11. A non-transitory computer readable storage medium for remote data collection management in a distributed computing environment, the distributed computing environment comprising a management server and a plurality of computer systems, each of the computer systems comprising a listening agent, the non-transitory computer readable storage medium comprising computer program instructions, that when executed by a computer, cause the computer to carry out the steps of:

receiving, by each listening agent from the management server, data collection process code, the data collection process code comprising a module of computer program instructions that, when executed at the behest of the listening agent, collects data describing the computer system;

executing, periodically at the behest of each listening agent, the data collection process code, including:

discovering, by the listening agent, one or more problem determination tools installed within at least one computer system; selecting one or more of the installed problem determination tools relevant to a request for problem determination data, and retrieving, on-demand by the listening agent from the management server, one or more additional tools; and installing the one or more additional tools;

collecting, by the data collection process code, data describing the computer system, including executing the installed problem determination tools and the additional tools to collect problem determination data; and uninstalling the additional tools by the listening agent upon completion of execution of the additional tools.

12. The non-transitory computer readable storage medium of claim 11 further comprising computer program instructions, that when executed by a computer, cause the computer to carry out the step of configuring the selected problem determination tools based on a rule set and correlating data from the selected problem determination tools.

13. The non-transitory computer readable storage medium of claim 12 further comprising computer program instructions, that when executed by the computer, cause the computer to carry out the step of transporting the correlated data to a remote system.

14. The non-transitory computer readable storage medium of claim 13 further comprising computer program instructions, that when executed by a computer, cause the computer to carry out the step of utilizing the transported data for analysis and creation of action plans.

15. The non-transitory computer readable storage medium of claim 14 further comprising computer program instructions, that when executed by a computer, cause the computer to carry out the step of applying the action plans via hardware and software deployment.

\* \* \* \* \*